March 23, 1926. 1,578,053
A. McD. McAFEE
PROCESS OF REMOVING ALUMINUM CHLORIDE RESIDUES FROM STILLS
Filed Dec. 13, 1923
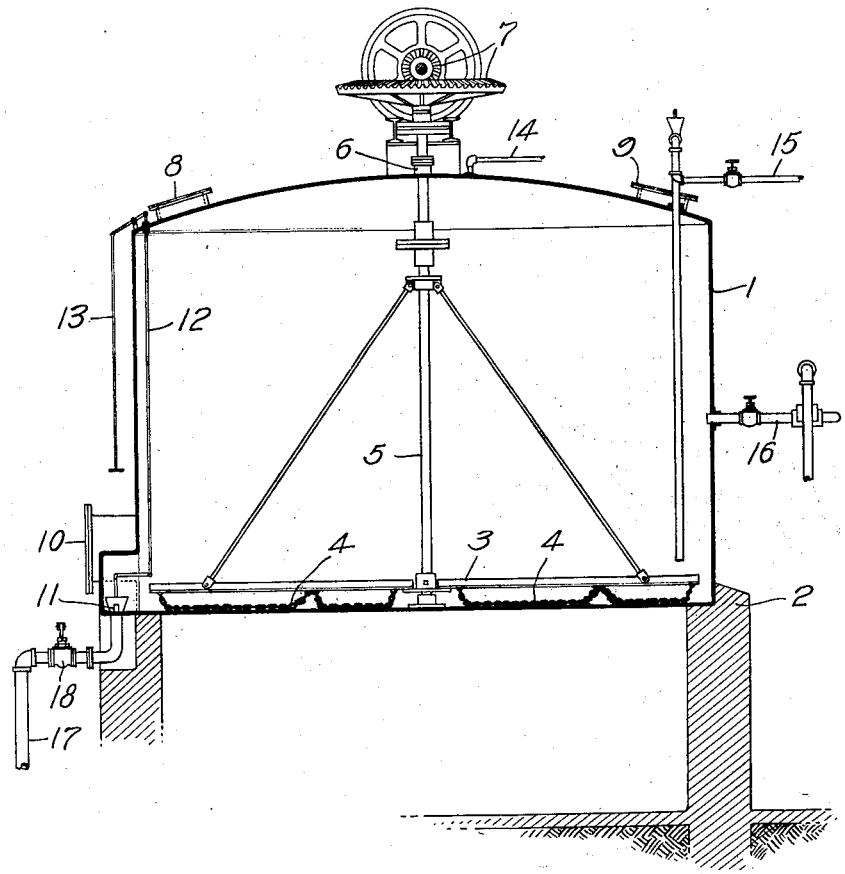
Inventor
ALMER McDUFFIE McAFEE,
By W. P. McElroy
Attorney Patented Mar. 23, 1926.

1,578,053

UNITED STATES PATENT OFFICE.

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS.

PROCESS OF REMOVING ALUMINUM CHLORIDE RESIDUES FROM STILLS.

Application filed December 13, 1923. Serial No. 680,512.

*To all whom it may concern:*

Be it known that I, ALMER McDUFFIE McAFEE, a citizen of the United States, residing at Port Arthur, in the county of Jefferson and State of Texas, have invented certain new and useful Improvements in a Process of Removing Aluminum Chloride Residues from Stills, of which the following is a specification.

This invention relates to processes of removing aluminum chloride residues from vessels in which aluminum chloride has been used for catalytic treatment of petroleum hydrocarbons and it comprises breaking up such residues into fine particles of coky matter and flushing such particles from the vessel with water, the particles being formed from the residue either by carrying the catalytic treatment to such a stage that stirring mechanism employed will break up the residue into such particles or by carrying the treatment to such a stage that a caked mass of the residues is formed in such condition that it can be disintegrated by water; and it further comprises more specifically the process of removing aluminum chloride residues from a still in which a distillation of pertoleum hydrocarbons with aluminum chloride has been performed and in which the residues are in the form of a caked mass, wherein the still, such caked mass and any residual oil are cooled by introduction of relatively cool oil, cooling oil and any residual oil admixed therewith are withdrawn, the cooled caked mass is wetted with water to disintegrate it and the disintegrated particles flushed from the still with water; all as more fully hereinafter set forth and as claimed.

As is well known from certain of my prior patents, the catalytic properties of anhydrous aluminum chloride can be usefully employed in improving lubricating oil and in the conversion of higher boiling petroleum oils, such as gas oil or solar oil, into lower boiling oils, such as gasoline and kerosene. Various modes of doing this are in use; the way in which the operation is conducted varying with the circumstances and with the products desired. In all cases, however, handling of the residues remaining after such operation is a problem of some complexity from a commercial point of view. It is desirable to remove the residues and clean the vessels with as little labor and in as short a time as possible and without damage to the vessel and it is equally desirable to conduct the operation under such conditions that the catalytic activity of the aluminum chloride is utilized to a maximum extent. Under different conditions, depending upon the character of the oils used and the character of the product desired, the time of operation, and other details, the residual material in the vessel has different characters. Sometimes the residual material is of a fluidity permitting pumping it therefrom. At this time, usually its activity is not exhausted and it may be utilized for various purposes. It may be used for other catalytic processes or it may be sent to recovery apparatus for the purpose of recovering aluminum chloride therefrom. At other times the catalytic process is carried to a point leaving a dry residue in which event there remains a relatively hard mass of aluminum chloride hydrocarbon compounds which is difficult to remove. Usually when the process is carried to this point such residual material contains little remaining free or little remaining active aluminum chloride but this is not necessarily so.

It is, however, best, when the process is carried on in such a way that a relatively hardy coky residue remains, to arrange conditions so that the activity of the aluminum chloride is substantially spent.

Whenever the catalytic process is conducted in such a way that if this relatively hard residue remains, it has been the custom to remove such residues from the vessel or still (when a distillation process has been performed) by hand labor and to preserve it for recovery of aluminum chloride therefrom. In addition to the time lost in cooling down the still to a point where workmen can enter, digging out the material by hand is a time consuming and arduous task. Entrance of workmen into the still is also fraught with danger and this character of work is particularly disagreeable to the laborers.

I have discovered that contrary to what would be expected, no corrosion of the vessel is to be feared upon treating such relatively hard residues with water. While the vessels in which the catalytic processes to which reference have been made are performed are always made of iron or steel and are readily corroded, for some reason, although a solution of aluminum chloride is produced when water comes in contact with the residues, the vessel is not attacked thereby. This may be due to the fact that the aluminum chloride is bound or masked with coke and that it takes some time for it to go into solution in water, or it may be due to the fact that the presence of certain amounts of oil in the residue protects such residue against the water for a sufficient length of time to prevent the formation of any substantial amounts of hydrochloric acid in the still, or it may be due to other reasons. But whatever the reason, I have found that this relatively hard residue may be flushed from the vessel with water without any corrosion of the still. At most, it is left with a bright "pickled" surface.

When the residue has been disintegrated by the action of mechanical means and when the catalytic process has been carried on so that the residue is in the form of relatively fine particles, these particles can be flushed from the still with water. And I have discovered more specifically, that when the residues are in the form of a relatively hard caked mass, this mass may be broken up upon wetting with water so that in a relatively short time, a half hour or less, fine particles are formed and these fine particles may be flushed from the vessel with water. Breaking up is a sort of spontaneous disintegration to a state of high fineness.

It is advantageous when removing residues by my process that the residue should contain relatively small amounts of active aluminum chloride and I have found that as a general rule, the less is the active aluminum chloride remaining in the residue at the time such a hard cake is formed, the easier and more efficient is the action of water in breaking up such a cake.

In cleaning out the vessel in accordance with my invention, I cool the vessel in certain ways and provide against the danger of fire by taking certain precautions which are hereinafter described in the specific example of the way of cleaning a still.

I have found it is advisable to introduce water under rather high pressure, say from 50 to 75 pounds, not only for the purpose of supplying a large quantity in a short time, but also for the purpose of destroying or knocking down the upwardly protruding portions of the hard mass in the still. Frequently at the end of a distillation process when the residue is left in such form that it can be broken up by water as described, there are portions of the residue adhering to the walls of the still and there are what might be termed large frozen bubbles over the surface of the residue. In fact, at times there are what might be called "stalagmites" 4 to 6 feet high. After the cooling operation this material remains somewhat warm and when the manholes are opened for the introduction of the hose, these "stalagmites" on exposure to air may catch fire and it therefore is advantageous to quickly direct against them a strong stream of water for the purpose of knocking them down.

As typical of a distillation leaving the character of residue which is disintegrated by water, in accordance with my process, and as typical of a process of cooling a still and removing the residue, the following example will serve although it is to be understood that I do not limit my invention to this distillation process preceding the formation of the residue.

In operating with a 1000 barrel still provided with a stirrer, I charge about 950 barrels of solar oil or gas oil of 35 to 40° Baumé. The burners (when such means of firing are used) are then started and this oil is heated to from 300 to 350° F., for the purpose of driving off all moisture. I then add 50 barrels of heavy oil, which may well be of the same nature as that originally charged to the still, having admixed with it sufficient anhydrous aluminum chloride to give me from 2 to 3 per cent of aluminum chloride by weight on the total charge. This added oil and aluminum chloride may advantageously be previously heated somewhat, say, as high as 150 to 200° F.; but not necessarily so. The heating of the still is continued or resumed if the firing has been discontinued during the introduction of the mixture of oil and aluminum chloride. Ordinarily, the firing is not discontinued during this introduction. The mixture is then brought to distillation temperature with continuous stirring, and pronounced activity of the aluminum chloride will become exhausted in about 24 to 30 hours. During the first 8 to 10 hours of the distillation, the aluminum chloride and its hydrocarbon compounds with the oils are apparently dispersed throughout the mass of oil undergoing distillation, because of the stirring and of the ebullition taking place, but at the end of this time, the aluminum chloride-hydrocarbon compounds settle toward the bottom of the still. Observation of the stirring apparatus indicates this point. There is a greater resistance to the drags. At the end of 24 to 30 hours, the resistance to the drag is such that it is impracticable to continue their operation without a great increase in power and at this time the activity of the aluminum chloride is practically spent as shown by the character of the distillate coming over. The aluminum chloride, or its combinations with hydrocarbons, settles on the bottom of the still and at this time, with the percentage of aluminum chloride indicated and the amount of solar oil forming the charge, there will be approximately 10 to 15 per cent, that is, 100 or 150 barrels, of solar oil remaining in the still. This residual solar oil is of purer character than that ordinarily charged to the still, but is not otherwise materially different. However, since it becomes more or less moist in the subsequent operations, I do not customarily use it in another charge.

At the time when distillation is stopped and the activity of aluminum chloride is spent and when the aluminum chloride and the aluminum chloride hydrocarbon compounds have formed into a relatively hard mass with an overlying layer of the residual solar oil or unconverted oil, I pump in about 500 barrels of cold heavy oil, such as gas oil or solar oil, for the purpose of cooling the still and its contents. It may be necessary in some circumstances to circulate the cooling oil through outside cooling coils and back to the still, in order to bring the oil down to a safe pumping-out temperature, which is around 250° F. When this temperature has been reached, a little steam is introduced at the top of the still and pumping out is immediately started. This top steam is to prevent access of air to the still during this pumping out operation. I preferably pump this cooling oil, which will be admixed with the residual oil in the still, to a tank and use it as cooling oil in a succeeding operation. The excess may be used for fuel oil. If dried, which may readily be accomplished by heating, it may, however be employed as charge oil for a succeeding operation. It is necessary to have a cooling coil between the still and the tank to which this oil is pumped, in order to further cool it down to a safe temperature before storing it.

At this stage of the operation, there remains in the still a hard mass of aluminum chloride-hydrocarbon compounds. I now turn in more steam and open the manheads of the still for the purpose of driving off gases and vapors and preventing explosions. The still now being open, I deliver a stream of cold water under 50 to 75 pounds pressure by means of a hose, through one of the manholes (knocking down the "stalagmites") until the mass of aluminum chloride compounds is thoroughly soaked with water. The lower manhole and the tar plug of the still are open, so that the excess of water drains out. Within a relatively short time, say, one-half hour or less, the cake or mass of aluminum chloride-hydrocarbon compounds will break up and as the supply of water is continued, the resultant pulpy mass is flushed out of the still. At about the time the material tends to break up, the drags are again started. This facilitates the discharge of the material through the tar plug. The tar plug may lead to a sump, from which the wet material is pumped to storage bins or tanks which preferably have perforated walls, permitting a rough filtration or seeping away of the water from the residual solid material. At times, there may be scales of material in the still around the rivets and portions of the drag and it is sometimes advantageous to scrape these off by means of a hand tool. The still is now at a temperature permitting a man to go inside.

With a few days of standing the water is sufficiently drained from the carbonaceous solid material to permit its use as fuel for furnaces, and indeed, it is fine enough to be used in pulverized coal burners. If the coky material is to be used for other purposes, it is sent to a filter press or a drier.

When the still is clean, the tar plug is closed and the manholes are replaced, and it is ready for another charge. Operating in the way described, with the distillation period consuming about 24 hours, and when I have found it necessary to recirculate my cooling oil, I have been able to entirely clean the aluminum chloride still and have it in condition for a fresh charge of solar oil in comparatively a short time.

In the accompanying drawings I have shown a still of the character used in aluminum chloride distillation and from which the residues may be removed in accordance with my invention. The view is a vertical section, certain parts being shown in elevation.

In the drawing, 1 indicates the vessel which in this instance is shown as a still mounted upon the fire box 2. The still may be fired in any of the usual ways. The still is provided with a stirrer 3 having chains or drags 4, such stirrer being operated by the shaft 5 passing through stuffing box 6 and operated by means of the gears 7. The still is provided with manholes 8, 9 and 10, and with the tar plug 11. The tar plug may be operated by the lever 12 and handle 13. The still is provided at the top with overhead steam connection 14 for introduction of top steam and with lines 15 and 16 for pumping up and/or circulating hot oil through outside cooling coils. Tar plug 11 is connected to pumps (not shown) by means of pipe 17 on which is located valve 18.

In operation, assuming that an aluminum chloride distillation process has been performed, the residues are left in the form of a more or less solid mass or cake at about the height of the lowest point of manhole 10. The depth of the solid mass will vary depending on the amount of aluminum chloride charged and the character of the oil, but as a rule it is on a level or somewhat lower than the lowest point of manhole 10. At this time the stirring mechanism is "frozen" in the mass, and the temperature of the mass may be above 600° F. In order to expedite the cooling of the still about 500 barrels of cold oil are pumped into the still through line 15. If at the end of this operation the contents of the still have not cooled to approximately 250° F. the valve on line 16 is opened and the oil is circulated through outside cooling coils (not shown) by means of a pump which sucks the oil out through line 16 and pumps it back into the still through line 15. Generally it is not necessary to circulate the oil because as a rule by the time 500 barrels of cold oil have been pumped into the still, the contents of the still will have a temperature of around 250° F., which is a safe pumping out temperature. The next operation is to introduce a little top steam through line 14 to displace vapors in the vapor space of the still. Tar plug 11 is then raised and valve 18 opened and the oil is pumped out through cooling coils and discharged to a stock tank at a temperature not exceeding the flash point of the oil. After all the oil has thus been pumped out of the still, more steam is put in through line 14, and the manholes 8, 9 and 10 are opened. At this time steam will escape through the manholes 8 and 9. Water is then introduced through manhole 10 by means of a hose or the like. Protuberances of residual material are knocked down by means of the water pressure and after about thirty minutes the hard, caked like mass of residual material has thoroughly disintegrated. During this thirty minute period the tar plug 11 and valve 18 have remained open and are in connection with the pump which is kept in operation from the time water is started in. After about thirty minutes the stirrer can be started which assists in delivering the disintegrated mass to the tar plug 11. By continuing a liberal supply of water while operating the stirrer and pumps the entire contents of the still are very quickly discharged through tar plug 11 and delivered to any convenient point.

What I claim is:

1. The process of removing aluminum chloride residues from a vessel in which aluminum chloride has been used for catalytic treatment of petroleum hydrocarbons, which comprises breaking up such residues into particles and flushing such particles from the vessel with water.

2. The process of removing aluminum chloride residues from a vessel in which aluminum chloride has been used for catalytic treatment of petroleum hydrocarbons, which comprises breaking up such residues with water to form small particles and flushing such particles from the vessel.

3. The process of removing aluminum chloride residues from a vessel in which aluminum chloride has been used for catalytic treatment of petroleum hydrocarbons, and in which the residues are in the form of a caked mass, which comprises wetting such mass with water to disintegrate it into small particles and flushing such particles from the vessel in the presence of water.

4. The process of removing aluminum chloride residues from a vessel in which aluminum chloride has been used for catalytic treatment of petroleum hydrocarbons, and in which the residues are in the form of a caked mass, which comprises cooling such mass and any remaining oil by introducing relatively cool oil, withdrawing the cooling oil and any oil admixed therewith, wetting the cooled mass with water to disintegrate it into small particles and flushing such particles from the vessel with water.

5. The process of removing aluminum chloride residues from a vessel in which aluminum chloride has been used for catalytic treatment of petroleum hydrocarbons, and in which the residues are in the form of a caked mass, which comprises cooling such mass and remaining oil by introducing relatively cool oil, admitting steam to displace inflammable vapors, withdrawing the cooling oil and any oil admixed therewith, wetting the cooled mass with water to disintegrate it into small particles and flushing such particles from the vessel with water.

6. The process of removing aluminum chloride residues from a still in which aluminum chloride has been used for catalytic treatment of petroleum hydrocarbons, and in which the residues are in the form of a caked mass, which comprises cooling such mass and remaining oil by introducing relatively cool oil, admitting steam to displace inflammable vapors, withdrawing the cooling oil and any oil admixed therewith, introducing additional steam before opening the still to the atmosphere to replace inflammable vapors, opening the still, wetting the cooled mass with water to disintegrate it into small particles and flushing such particles from the vessel with water.

7. In the removal of aluminum chloride residues from a vessel, the process which comprises forming a residue of such a character that it will disintegrate into small particles upon wetting with water, wetting the same with water to form such particles and flushing such particles from the vessel with water.

8. In the removal of aluminum chloride residues from a still, the process which comprises forming a hard residue such as would be left upon distillation of 1000 barrels of solar oil with 2 to 3 per cent of aluminum chloride to leave substantially 10 to 15 per cent of solar oil in the still, breaking up such a residue with water and flushing it from the still with water.

9. The process of removing aluminum chloride residues from a still in which aluminum chloride has been used for converting higher boiling petroleum hydrocarbons into lower boiling petroleum hydrocarbons and in which the residues are in the form of a caked mass with upwardly extending protuberances, which comprises directing a stream of water under pressure against such protuberances to knock them down, wetting such mass with water to disintegrate it into fine particles and flushing such particles from the still with water.

10. The process of removing aluminum chloride residues from a still in which aluminum chloride has been used for converting higher boiling petroleum hydrocarbons into lower boiling petroleum hydrocarbons and in which the residues are in the form of a caked mass which comprises directing water under pressure against such mass to wet it whereupon it will disintegrate into small particles and flushing such particles from the still with water.

11. The process of breaking up hard residua arising from the catalytic action of aluminum chloride on oils and of removing such residue from vessels in which such catalytic actions have been performed which comprises wetting such a residuum with sufficient water to cause its disintegration into a wet pulpy mass and removing such mass from such vessel.

12. In the handling of aluminum chloride coky residues left after catalytic distillation of petroleum hydrocarbons with aluminum chloride, the step of wetting such residues with water to disintegrate them into small particles.

13. The process of removing from the vessel residues resulting from treatment of petroleum hydrocarbons therein with aluminum chloride, which comprises cooling such residues and then adding water to them while in the vessel to soften them sufficiently to allow flushing from the vessel with water.

In testimony whereof, I have hereunto affixed my signature.

ALMER McDUFFIE McAFEE.